May 17, 1938.  J. L. CHANEY  2,117,942
THERMOMETER
Filed Feb. 15, 1937   2 Sheets-Sheet 1
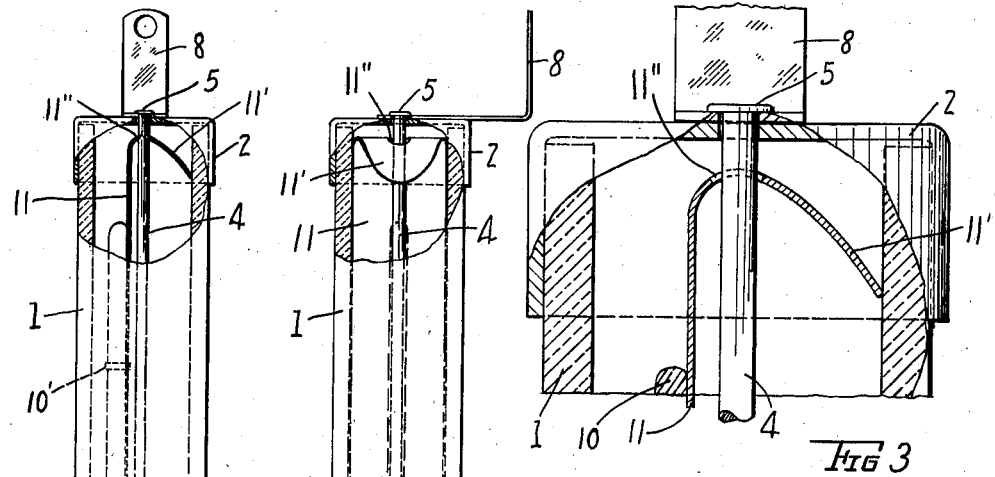
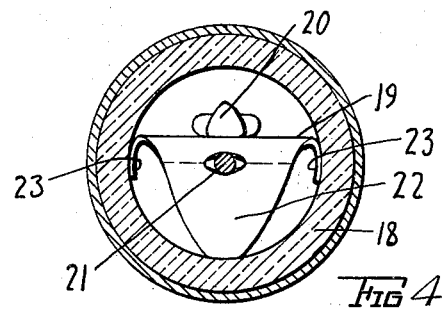
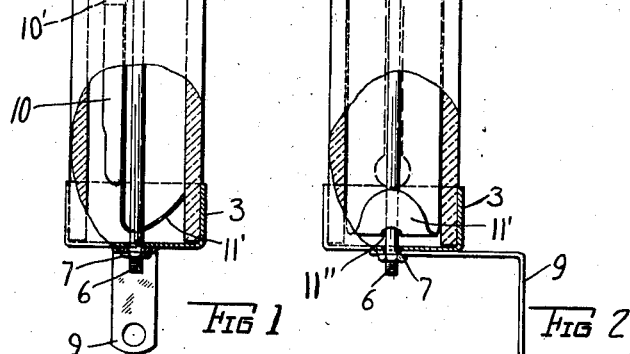
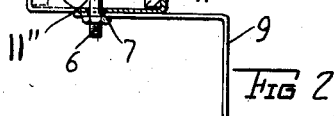
INVENTOR
John L. Chaney
BY Staley & McTch
ATTORNEYS May 17, 1938. J. L. CHANEY 2,117,942
THERMOMETER
Filed Feb. 15, 1937 2 Sheets-Sheet 2
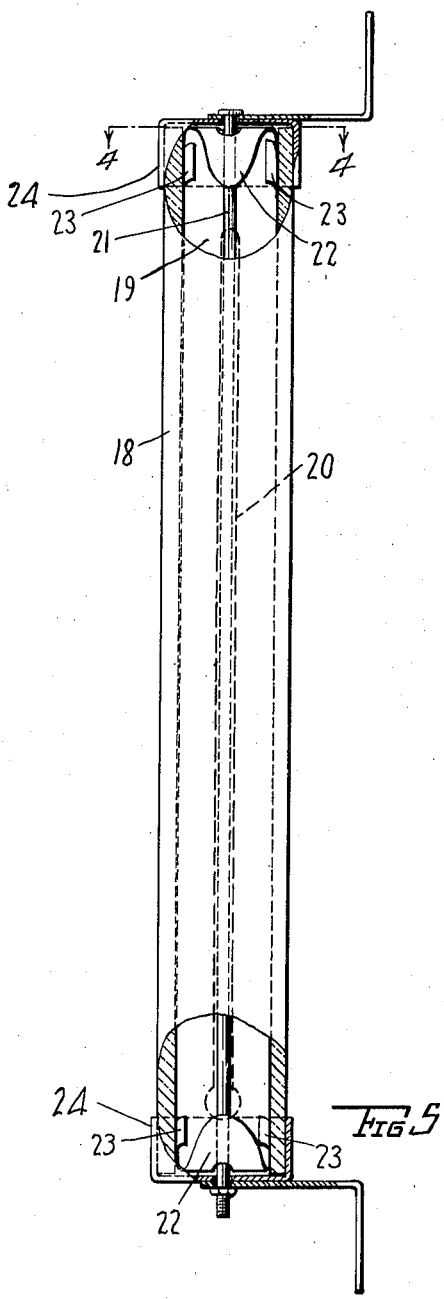

Patented May 17, 1938

2,117,942

UNITED STATES PATENT OFFICE 2,117,942

THERMOMETER

John L. Chaney, Springfield, Ohio, assignor of one-half to Lee F. Chaney, Springfield, Ohio Application February 15, 1937, Serial No. 125,754

1 Claim. (Cl. 73—374)

This invention relates to thermometers, particularly to a thermometer of the type which has an enclosing casing for the thermometer tube and its scale, the invention especially relating to a scale member which has means for engaging the interior surface of the casing to hold the scale member and thermometer tube in position therein independently of any other securing means for the scale member.

An object of the invention is to provide a thermometer of the type referred to employing a scale member which will be simple in construction, economical in manufacture and effective for the purpose for which it is designed.

A further and more specific object of the invention is to provide a scale member for a thermometer of the type referred to which has means for frictionally engaging the interior surface of the enclosing casing to hold the scale member and the thermometer tube in correct position therein.

In the accompanying drawings:

Fig. 1 is a view partly in side elevation and partly in vertical section of a thermometer embodying the improvements.

Fig. 2 is a view partly in rear elevation and partly in vertical section of the same.

Fig. 3 is an enlarged view partly in side elevation and partly in vertical section of the upper portion of the thermometer.

Fig. 4 is a section on the line 5—5 of Fig. 5 which shows a modification.

Fig. 5 is a view partly in rear elevation and partly in vertical section of a modification.

Referring first to Figs. 1, 2 and 3 of the drawings, 1 represents an outer casing, which in the present case is in the nature of a glass tube of cylindrical form open at both ends. The open ends of this casing are closed by metallic caps 2 and 3 which are clamped to the ends of the casing by a rod 4 extending through the casing, one end of the rod such as the upper end having a head 5 and the other end, such as the lower end, being threaded as indicated at 6 to receive a nut 7. Brackets 8 and 9 are preferably clamped between the head 5 and the nut 7 to secure the thermometer in position at any suitable point.

The thermometer tube is indicated at 10, this tube being secured to the scale member 11, which in the present case is formed of a strip of thin sheet metal, the thermometer tube being secured to this chart member in the usual way by clips 10' as shown in dotted lines in Fig. 1.

In order to hold the chart member and its attached thermometer tube in position in the casing, each end of the chart member 11 is reduced and bent at an acute angle to the chart member as indicated at 11' so as to provide tongues which will have some resiliency and which will frictionally engage the interior wall of the casing 1 to frictionally hold the chart member and its attached thermometer tube in any desired position in the casing. The chart member at the points where these tongues are bent therefrom is provided with apertures 11" to accommodate the rod 4 which holds the caps 2 and 3 in position, these apertures being of sufficient size that the rod will sufficiently clear the chart member so as to have no effect upon its adjusted position when the parts are being assembled, or in the event that after assembling the rod should be loosened to permit for a correct adjustment of the brackets 8 and 9.

In Figs. 4 and 5 there is shown a modification in which 18 represents the outer casing, 19 the chart member, 20 the thermometer tube and 21 the rod, which holds the end caps 24. In this case each end of the chart member is reduced and bent to the form shown in Figs. 1, 2 and 3 as shown at 22 so as to engage the interior walls of the casing, and each end of the chart member has each side edge thereof formed with tongues 23 which are bent at substantially right angles thereto to also engage the interior walls of the casing.

Having thus described my invention, I claim:

In a thermometer, an outer open-ended casing, a cap for each end of said casing, a tie rod extending through said casing to clamp said caps in position, a flat scale member and a thermometer to be attached thereto located in said casing and being substantially as long as said casing, said scale member having each end thereof bent at an obtuse angle thereto to provide tongues for frictionally engaging the interior wall of said casing to hold said scale member and thermometer tube in position therein, each of said tongues having an aperture to accommodate said tie rod.

JOHN L. CHANEY.